March 13, 1951     J. MAGNUSSON     2,545,292
LABELING MACHINE Filed Sept. 13, 1945     9 Sheets-Sheet 1

March 13, 1951   J. MAGNUSSON   2,545,292
LABELING MACHINE

Filed Sept. 13, 1945   9 Sheets-Sheet 2

Fig. 4

INVENTOR
Joseph Magnusson
BY J. Stanley Churchill
ATTORNEY

March 13, 1951     J. MAGNUSSON     2,545,292
LABELING MACHINE

Filed Sept. 13, 1945     9 Sheets-Sheet 3

Fig. 5

INVENTOR
Joseph Magnusson
BY J. Stanley Churchill
ATTORNEY

March 13, 1951     J. MAGNUSSON     2,545,292
LABELING MACHINE

Filed Sept. 13, 1945     9 Sheets-Sheet 6

INVENTOR.
Joseph Magnusson
BY J. Stanley Churchill
ATTORNEY

March 13, 1951         J. MAGNUSSON         2,545,292
LABELING MACHINE
Filed Sept. 13, 1945                    9 Sheets-Sheet 7

INVENTOR.
BY Joseph Magnusson
J. Stanley Churchill
ATTORNEY

March 13, 1951  J. MAGNUSSON  2,545,292
LABELING MACHINE

Filed Sept. 13, 1945  9 Sheets-Sheet 8

INVENTOR.
Joseph Magnusson
BY J. Stanley Churchill
ATTORNEY

March 13, 1951  J. MAGNUSSON  2,545,292
LABELING MACHINE
Filed Sept. 13, 1945  9 Sheets-Sheet 9

INVENTOR
Joseph Magnusson
BY J. Stanley Churchill
ATTORNEY

Patented Mar. 13, 1951

2,545,292

UNITED STATES PATENT OFFICE 2,545,292

LABELING MACHINE

Joseph Magnusson, Wollaston, Mass., assignor to Pneumatic Scale Corporation, Limited, Quincy, Mass., a corporation of Massachusetts Application September 13, 1945, Serial No. 615,973

6 Claims. (Cl. 216—55)

This invention relates to a labeling machine.

The object of the invention is to provide a labeling machine with novel and improved labeling mechanism wherein the labels are withdrawn from a stack thereof and handled during the subsequent label applying operation in a novel and efficient manner, and wherein provision is also made for pneumatically controlling the operation of the labeling mechanism in a novel and efficient manner.

With this general object in view and such others as may hereinafter appear, the invention consists in the labeling machine and in the various structures, arrangements, and combinations of parts hereinafter described and particularly defined in the claims at the end of this specification.

In the drawings illustrating the preferred embodiment of the invention.

Figure 10:
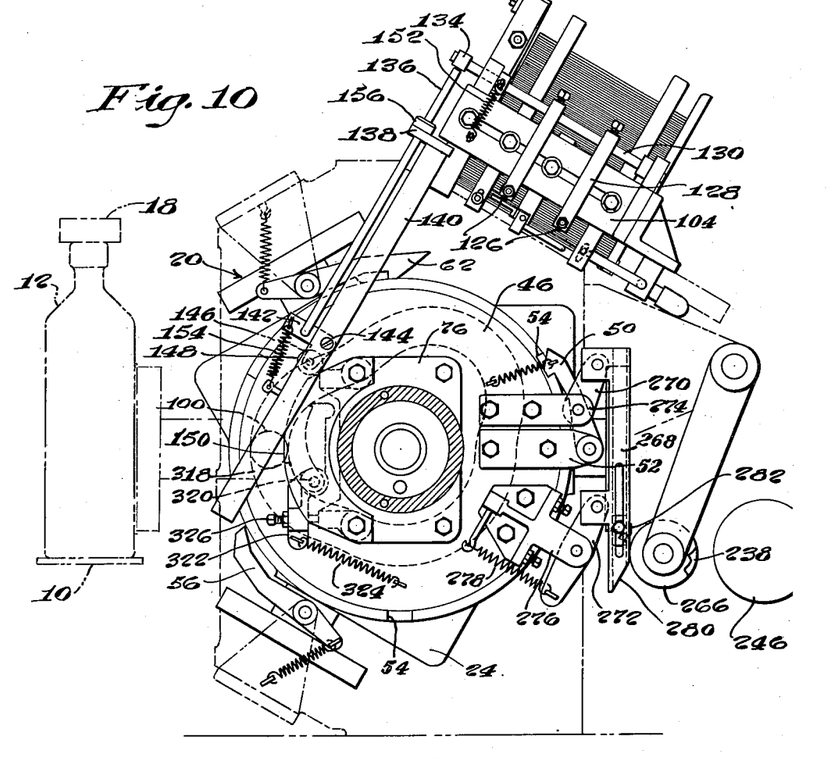
Fig. 10 is a view of the label magazine and associated mechanism as viewed from the opposite side of Fig. 9.

Referring now to the drawings, the present invention is illustrated as embodied in a labeling machine having an intermittently operated conveyor indicated generally at 10 upon which the containers 12 are carried in spaced relation for registration with the present labeling mechanism. The conveyer 10 may and preferably will comprise the intermittently operated conveyer illustrated and described in the U. S. patent to Everett, No. 2,245,659 issued June 17, 1941, and which may be arranged to run in timed relation to the operation of the labeling apparatus for the application of successive labels to successive containers. As shown in said patent and as illustrated herein, see Fig. 4, the conveyer includes a cooperating upper chain 16 provided with a plurality of presser pads 18 engaging the tops of the containers to firmly hold the latter in registered position during the application of labels. As indicated generally in Fig. 5 the present labeling apparatus comprises a plurality of, herein shown as three, suction heads or pads 20 mounted upon the outer ends of radially extended arms 22 carried by and arranged for reciprocation in an intermittently rotated spider 24.

Figures 1, 2, 3:
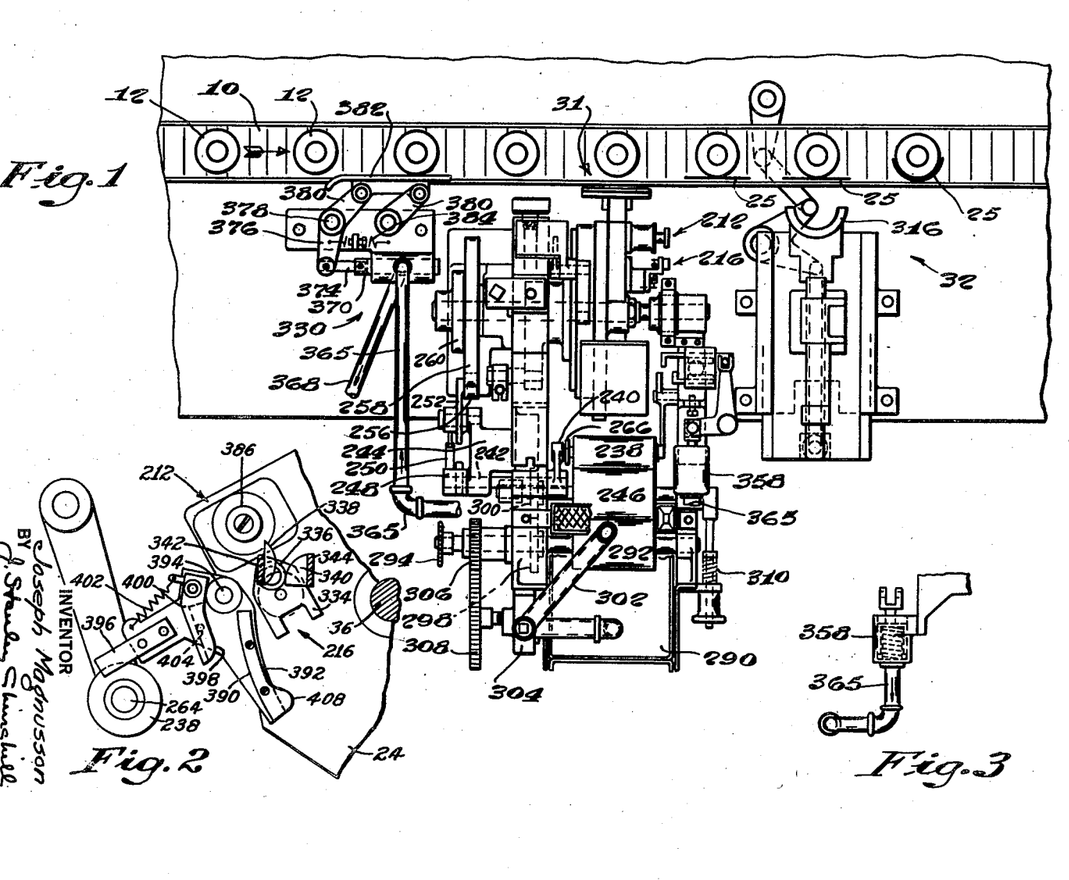
Fig. 1 is a plan view of a labeling machine embodying the present invention.
Fig. 2 is a side elevation of control mechanism with the parts shown in their normal operating position.
Fig. 3 is a detail view in side elevation of a pneumatically-operated control device of the machine shown in Fig. 1.
Figure 5:
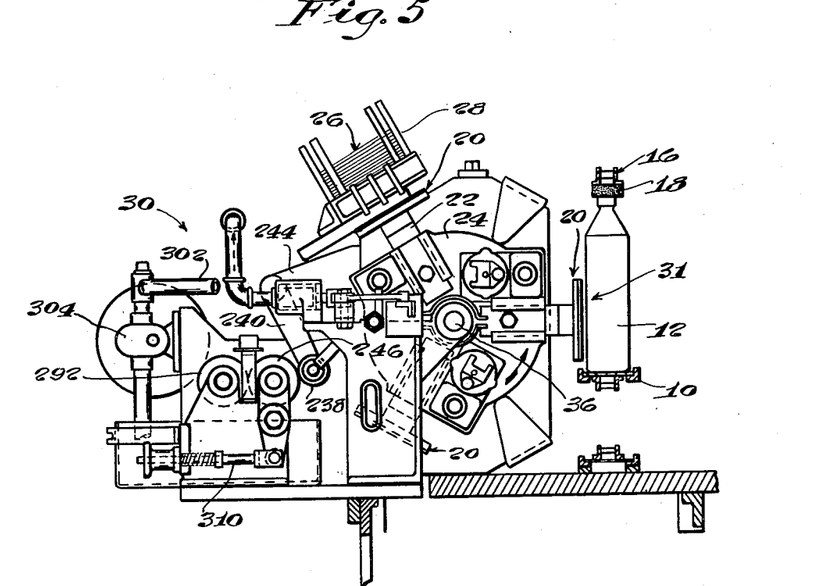
Fig. 5 is a similar view as seen from the right of Fig. 1.

In general, the operation of the apparatus during one complete revolution of the spider is as follows: The suction pad 20 in the upwardly extended position shown in Fig. 5 is reciprocated to engage and withdraw the lowermost label 25 from a stack 26 thereof supported in a magazine 28. The spider is then rotated 120 degrees to carry the suction pad and label past the adhesive applying mechanism, indicated generally at 30, and which is arranged to provide a film of adhesive on the label held by the suction pad. The spider is then again moved 120 degrees to present the pad at the label applying station indicated generally at 31 where the suction pad is again reciprocated to affix the label to the container, the suction being released prior to the retracting movement of the pad to free the label from the latter. As indicated in Fig. 1, the label thus applied in its flat condition to a round container is merely "tacked" on, adhering to the container in an area adjacent the plane of tangency sufficient to hold the label in position for a subsequent wiping or pressing operation by pressing mechanism at the station indicated generally at 32, and such mechanism operates to press the adhesive coated label into firm engagement with the container.

Figure 7:
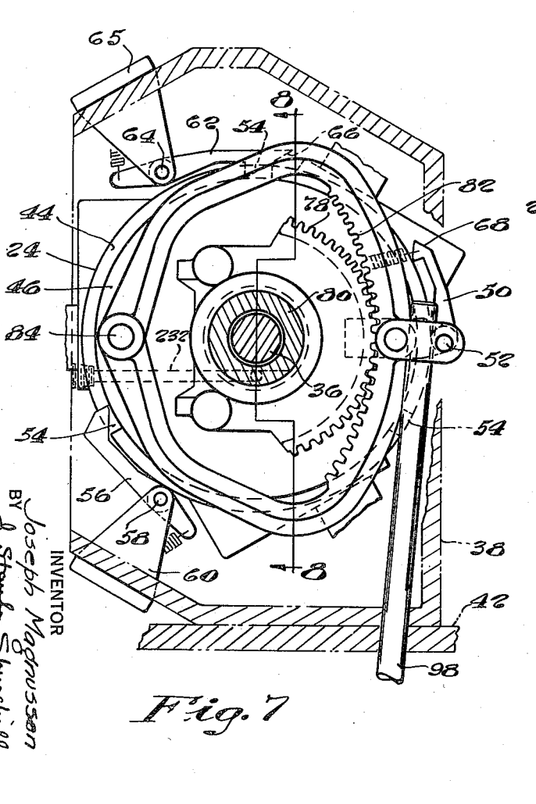
Fig. 7 is a cross-sectional view taken on the line 7—7 of Fig. 8 illustrating the intermittent driving mechanism for rotating the label carrying and applying pads.
Figure 8:
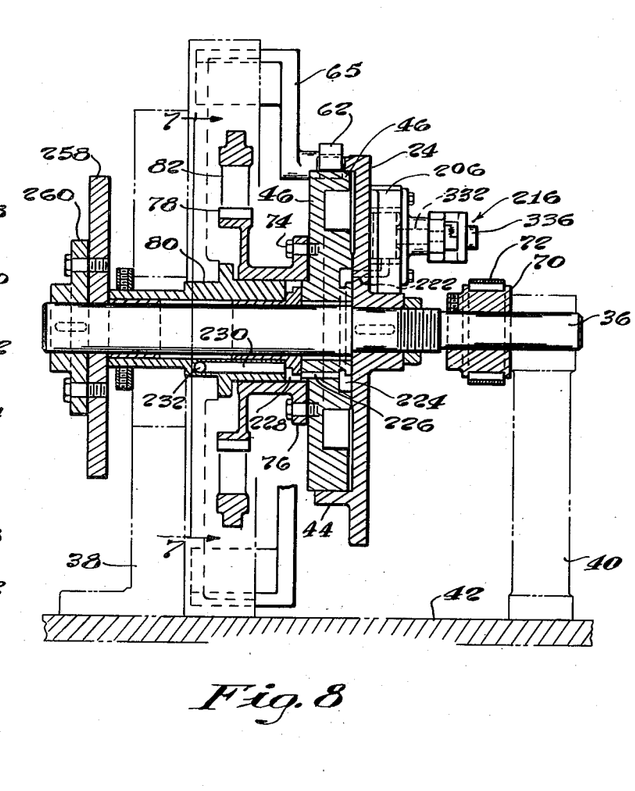
Fig. 8 is a cross section taken on the line 8—8 of Fig. 7.

Referring now to Figs. 4, 7, 8 and 10 provision is made for intermittently rotating the spider 24 to present the suction pad 20 to the different stations of operation through connections from the main driving shaft 34 of the labeling machine. As herein shown, the spider 24 is keyed to a shaft 36 rotatably supported in brackets 38, 40 mounted on the platform 42 of the machine frame. The spider 24 is provided with a cylindrical flange 44 which is interiorly bored to snugly receive the outer periphery of a disc cam member 46 loosely mounted on the shaft 36 and arranged to be rocked back and forth through 120°. As best shown in Fig. 10 the cam member 46 is connected to the spider 24 to effect intermittent advancement thereof through 120° during each cycle of operation by a spring held driving pawl 50 pivotally connected to a member 52 attached to the back of the cam disc 46. During each cycle of operation, the pawl 50 is arranged to engage one of three notches 54 cut 120° apart in the overlapping flange 44 of the spider 24 so that when the disc is rocked in one direction, the pawl will engage and fall into a notch 54 and when the disc is rocked in the opposite direction the spider 24 and its suction pads 20 will be advanced 120°. In order to lock the spider 24 during the return stroke of the driving pawl 50, a spring pressed pawl 56 pivotally mounted at 58 in a bracket 60 is arranged to engage a notch 54, as shown in Fig. 7. Provision is also made for definitely limiting the forward stroke to 120° to insure accurate registration of the suction pads with the cooperating mechanisms, and as herein shown, a second holding pawl 62 pivotally mounted at 64 in a bracket 65 is arranged to drop into a notch 54 at the end of the advancing stroke of the driving pawl 50. An extension of the pawl 62 has a cam surface 66 arranged to be engaged by a corresponding surface 68 of the driving pawl 50 to lift the holding pawl 62 out of its notch at the end of the return stroke and to hold it out during the start of the advancing stroke. Provision is also made for frictionally holding the shaft 36 to prevent over-riding thereof, and as shown in Figs. 1 and 8, a brake drum 70 is provided on the shaft 36 adjacent the bearing bracket 40 which is arranged to be engaged by an adjustable friction band 72.

As shown in Figs. 7 and 8 the cam disc 46 is connected by bolts 74 to a radial flange 76 on a gear segment 78 which latter is rockingly mounted on an elongated stationary sleeve 80 supported in the bracket 38. The gear segment 78 is in mesh with an internal gear segment 82 pivotally mounted on a stud 84 fast in the bracket 38. The internal gear segment 82 is arranged to be rocked back and forth through an arc of about 60° by a cam 86 fast on the main shaft 34 and connections including a cam roll 88 carried by an arm 90 pivoted at 92, a second arm 94 adjustably connected to an adjacent arm 96, and a connecting rod 98 secured to the segment 82. Thus, in operation, the spider 24 is rotated with the cam disc 46 during the forward or clockwise rotation of the latter, as viewed in Fig. 7 and is held stationary during the return or counterclockwise rotation of the cam disc.

Figure 9:
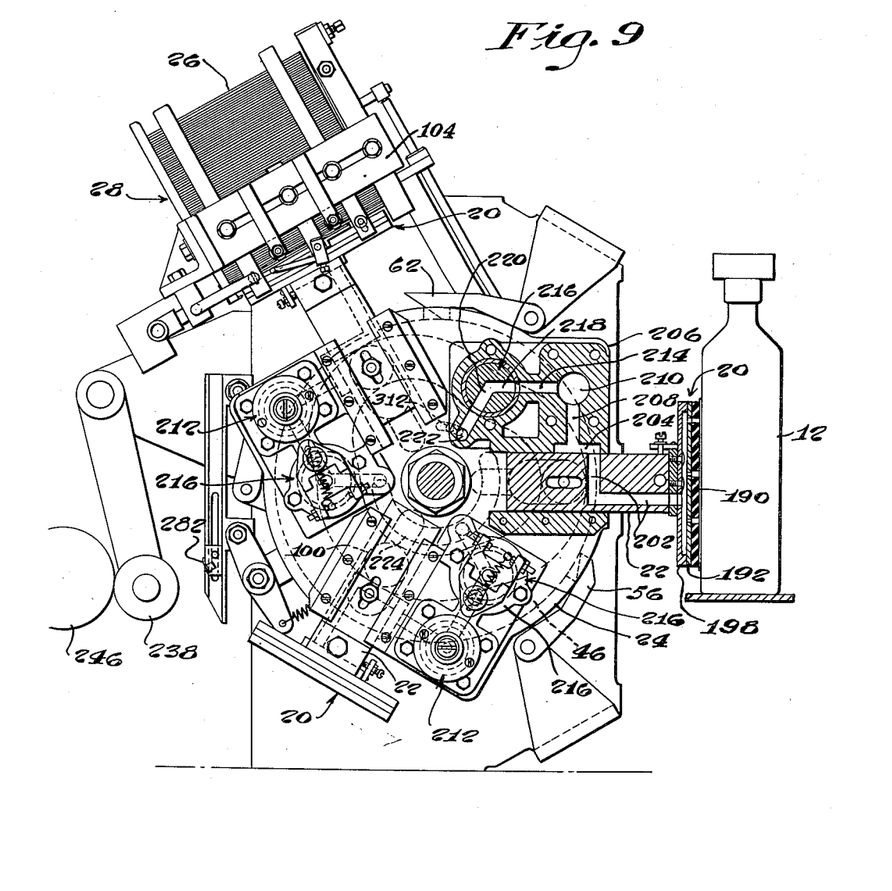
Fig. 9 is an enlarged side elevation as viewed from the right in Fig. 1 with some of the parts removed and others in cross section and showing a label pad extended and in engagement with a label to be withdrawn from the magazine.
Figure 13:
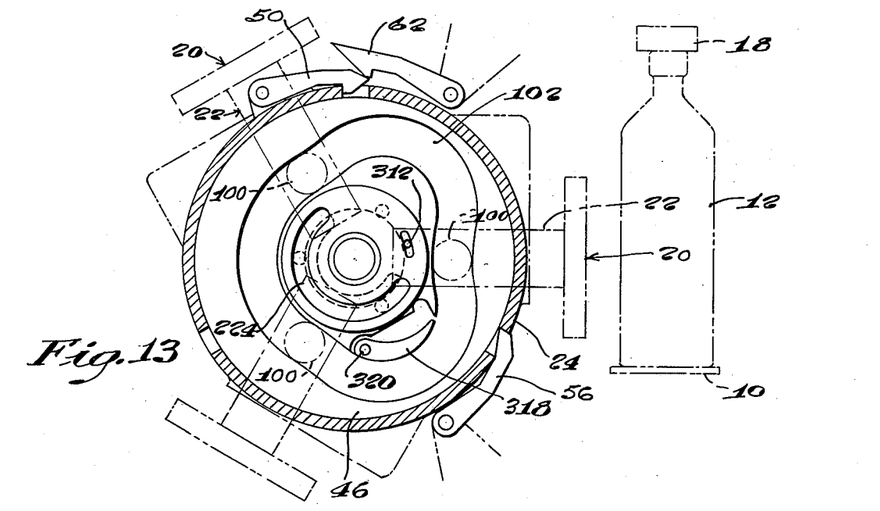
Figs. 13 and 14 are views in different positions of operation of the intermittently operated label pad extending and withdrawing cam and showing various ports arranged to be opened and closed to admit or cut off air to the label pads.

As above stated, the suction pads 20 are mounted upon radial arms 22 carried by the spider 24 and, as herein shown, the arms 22 are arranged to be reciprocated at the label withdrawing and applying stations during the reverse rotation of the cam disc 46. As shown in Fig. 9, each radially extended arm 22 is provided with a roller 100 adjustably secured thereto and arranged to cooperate with a cam groove 102 formed in the oscillating cam disc 46. During the advancing stroke of the driving pawl 50, the cam and spider are moved as a unit through 120° from the position shown in Fig. 13 to the position shown in Fig. 14 during which time the arms 22 and pads 20 are in their retracted positions. The cam disc 46 is then rotated 120° in the opposite direction while the spider remains stationary and during such return stroke of the cam disc, the cam groove 102 effects extension and retraction of the spider arms 22 and their suction pads 20 at the label withdrawing and label applying stations. Fig. 9 illustrates the mechanism at its halfway point with the arms 22 extended at the two stations as described, the remaining arm being retained in its retracted position, as shown. A full return stroke of the cam disc 46 disposes the parts in their original position as shown in Fig. 13 at the start of a new cycle of operation.

The label magazine 28 is provided with a stack of labels from which successive lowermost labels are withdrawn by successive suction pads 20, each pad pneumatically engaging and pulling downwardly on the forward end of the lowermost label, the remainder of the label being drawn off the bottom of the stack and pneumatically engaged by the pad as the latter is moved to the next station of operation, as more fully illustrated ad described in Patent No. 2,494,186 issued January 10, 1950, to which reference may be made.

Figure 6:
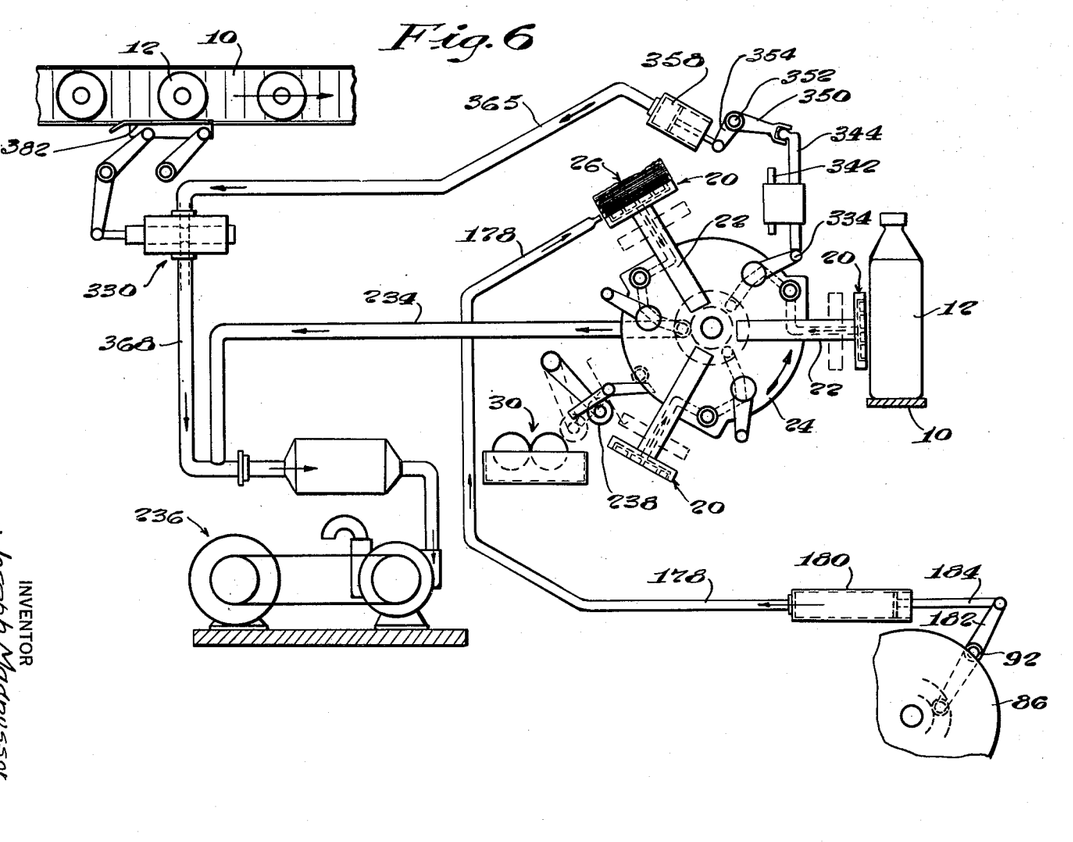
Fig. 6 is an outline view diagrammatically illustrating the connections to the pneumatically-operated devices.

As herein shown, each suction pad 20 is mounted on a hollow head 198 adjustably secured to the end of its reciprocating arm 22. The suction openings 194, 196 communicate with an air chamber 200 formed in the head 198 which connects with a passageway 202 formed in the arm 22. The passageway 202 extends at right angles, as best shown in Fig. 9, through one side of the reciprocating arm 22 and into communication with an elongated port 204 formed in a control casing 206 attached to the spider 24. The port 204 is of a length such as to permit sliding connection of the passageway 202 therewith during the extension and retraction of the arm 22. The port 204 is connected by a passageway 208 to a chamber 210 formed in a pneumatically operated control unit 212, to be hereinafter described, and a passageway 214 connects the chamber 210 to a rotary valve unit 216 having two radial passageways 218, 220 one of which communicates with the passageway 214 and the other with a port 222, see Fig. 8, which extends through the control casing 206 and through the spider 24. Each port 222 is arranged to open into an arcuate chamber 224 formed in the face of the cam member 46, and, during the relative movement of the cam and spider 24, the ports are opened and closed to admit or cut off the air to the suction pad 20, as will be hereinafter more fully described. The chamber 224 is connected by a passageway 226 to an annular chamber 228 which in turn is connected by a passageway 230 extending longitudinally through the stationary sleeve 80 and then at right angles thereto to communicate with a passageway 232 extending through the frame 38, as shown in Fig. 7. The passageway 232 is connected by a pipe 234 to a suction pump unit 236, as diagrammatically illustrated in Fig. 6.

Figure 4:
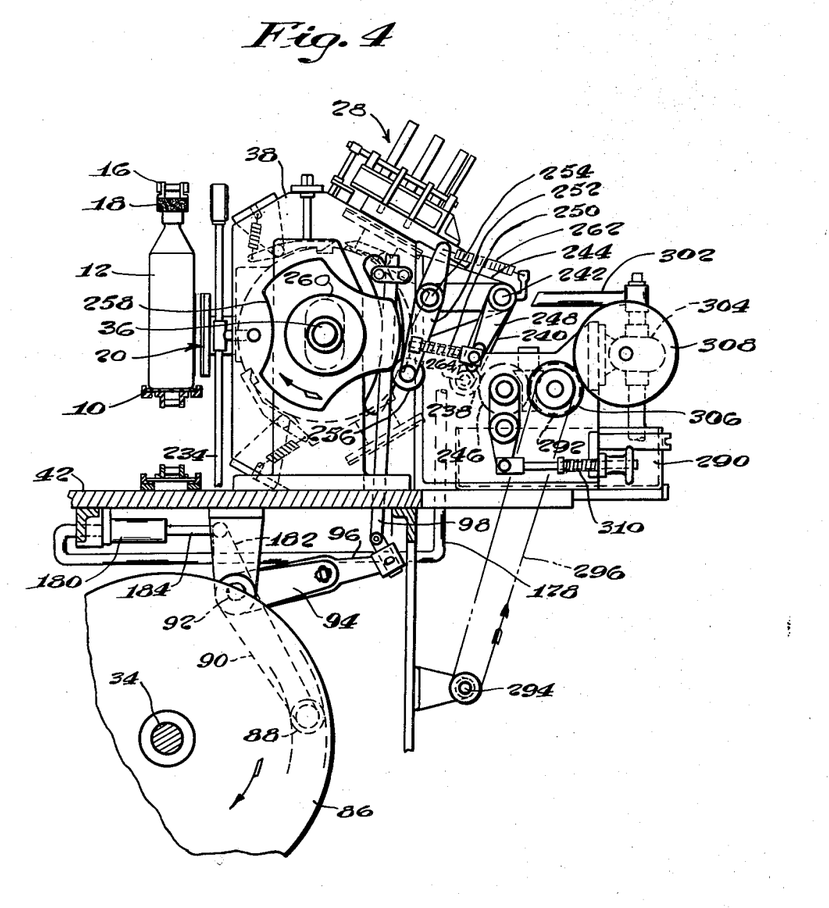
Fig. 4 is a side elevation of the labeling machine as viewed from the left of Fig. 1.

As above stated, during the advancement of the pad and its label from the withdrawing station to the next station the pad passes the adhesive applying mechanism 30 during which time the label is brought into engagement with an adhesive applying roller 238 normally disposed in the path thereof to apply a film of adhesive to the label. As illustrated in Figs. 1 and 4, the adhesive applying roller 238 is carried by an arm 240 fast on a shaft 242 journaled in a bracket 244 attached to the frame member 38. Provision is made for rocking the roller 238 into and out of engagement with an adhesive supply roll 246 during each cycle of operation, and as herein shown, the shaft 242 is provided with a second arm 248 connected by a link 250 to an arm 252 fast on a shaft 254 journaled in the bracket 244, the link 250 being pivotally connected to the arm 248 and arranged to slide through an opening in a swivel 251 carried by the arm 252, and a spring 253 coiled about the link 250 is interposed between the swivel 251 and the arm 248 to provide a resilient connection. The arm 252 is provided with a roller 256 arranged to cooperate with a three point cam 258 adjustably secured to a cam disc 260 fast on the shaft 36, see Fig. 8. A spring 262 is provided to urge the roller 256 into engagement with its cam. Thus, in operation, during each intermittent movement of the spider 24 to advance the shaft 36 the adhesive applying roller 238 is brought into engagement with the supply roll 246, and returned into position to apply a film of adhesive to the label as the pad is moved past the same.

Figures 11, 12:
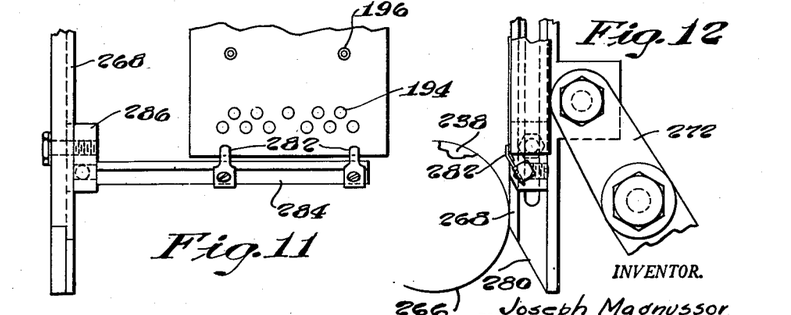
Figs. 11 and 12 are enlarged front and side elevations respectively of a portion of the label pad and associated gripping mechanism with a portion of collar 266 broken away in Fig. 12 to expose an end portion of roller 238.

Through the provision of the spring connection associated with the link 250, the adhesive applying roller 238 is arranged to be yieldingly pressed against the label pad. In order to guide the roller 238 with relation to the label so as to maintain a substantially uniform pressure and even distribution of the adhesive on the label, the roller shaft 264 is provided with a metal collar 266 arranged to engage a rail 268 (Fig. 10) mounted on and movable with the rocking cam disc 46. As best shown in Fig. 10, the rail 268 is carried by parallel links 270, 272 pivotally mounted in brackets 274, 276 respectively, attached to the back of the cam member, and, the rail is disposed to travel in parallel relation to successive suction pads 20 as they are intermittently moved past the adhesive applying device. A spring 278 is provided to urge the rail outwardly, and, in operation, when the cam disc is intermittently moved past the adhesive applying device the collar 266 engages the beveled front end 280 of the rail and presses it down until the roller 238 engages the label carried by the pad. In order to prevent displacement of the label when engaged by the adhesive applying roller 238, a pair of spring clamping fingers 282 are provided which are arranged to engage the forward edge of the label and hold it in place on the suction pad. As shown enlarged in Figs. 11 and 12 the clamping fingers are attached to a square rod 284 extended from a block 286 adjustably mounted on the rail 268. The clamping fingers are adjusted so that when the guide collar 266 engages the rail 268 to press it down as described, the fingers engage the edge of the label as shown in Fig. 12, and, upon continued movement of the pad the adhesive roller passes over the fingers and the label. At the end of the advancing stroke of the cam disc 46, the rail together with the clamping fingers are rocked up away from the pad by the spring 278, and, upon rotation of the disc in the opposite direction the rail unit is returned into parallel position with a succeeding suction pad. On the return stroke the roller 238 is rocked out of the way to avoid the rail as shown in Fig. 9.

Referring now to Figs. 1 and 4, the supply roll 246 is rotatably supported above a supply tank 290 and is arranged to cooperate with a spreader roll 292 which is rotated from a driving shaft 294 of the labeling machine by a chain and sprocket connection 296, the rollers 246 and 292 being connected by gears 298, 300. Adhesive is supplied to the rollers through a pipe 302 by a continuously circulating supply system including a pump 304 which is driven through cooperating gears 306, 308, as best shown in Fig. 1. A uniform film of adhesive may be maintained on the supply roller 246 by adjustment of the latter with relation to the roller 292 through mechanism indicated generally at 310. As herein shown, the roller 246 is carried by one arm of a two-armed lever 311 pivotally mounted at 313, the second arm being connected by a link 317 which extends through an opening in a bar 319 attached to the frame. The outer end of the link is threaded and provided with an adjusting nut 321, and a spring 323 coiled about the link is interposed between a collar 325 fast on the link and the bar 319. The spring 323 is arranged to urge the roller 246 toward the roller 292, and rotation of the nut 321 effects adjustment of the spacing between the rollers to provide a uniform film of adhesive.

When the spider is moved to present the suction pad and label to a container 12 on the conveyor 10, the arm 22 is reciprocated as above described to apply the label to the container. As best illustrated in Fig. 9, in which the pad is shown in its maximum outward position in engagement with the container 12, the oscillating cam member 46 is in its half-way position on its return stroke traveling in a clockwise direction. In such position it will be observed that the end of the arcuate chamber 224 has passed beyond the port 222 communicating with the pad in engagement with the container and that the port is in alignment with a vent port 312 (Fig. 15) which is open to the atmosphere through a channel 314 thus relieving the label on the pad to permit it to adhere to the container. The label thus applied is only loosely attached, adhering to the container merely at its contact with the container. Upon advancement of the container upon the intermittently movable conveyor 10, as shown in Fig. 1, the labeling operation is completed at the label pressing or wiping station 32 which operates to firmly press the label on the container. The label wiping mechanism may be of any usual or preferred form herein illustrated as comprising a reciprocable member 316 shaped to conform to the contour of the container.

Figure 14:
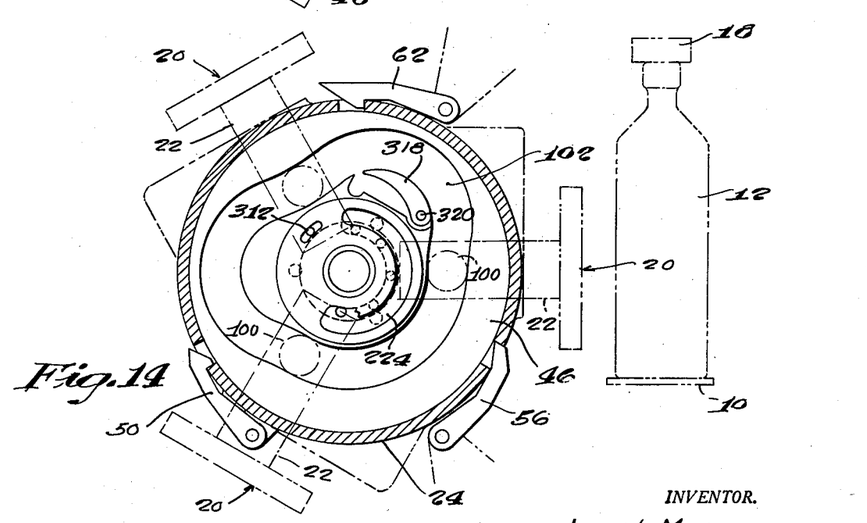

As illustrated in Figs. 9, 13 and 14 in order to cause the pad to press against the container with a yielding pressure during the applying operation, a portion 318 of the inner wall of the cam 102, which is disposed to urge the arm 22 outwardly at the applying station, is arranged to be movable with respect to the remainder of this wall. As herein shown, the portion 318 comprises an arcuate member conforming to the contour of the said wall and is pivotally mounted on a stud 320 supported in the cam disc 46. The stud 320 is also provided with an arm 322 (Fig. 10) to which a spring 324 is connected and arranged to urge the cam piece 318 into operative position as determined by an adjustable stop screw 326 also carried by the arm 322. As thus constructed it will be seen that when the pad engages the container a slight yielding of the same is permitted to accommodate variations in the diameters of successive containers and to prevent breakage in the event of a jam.

Figure 15:
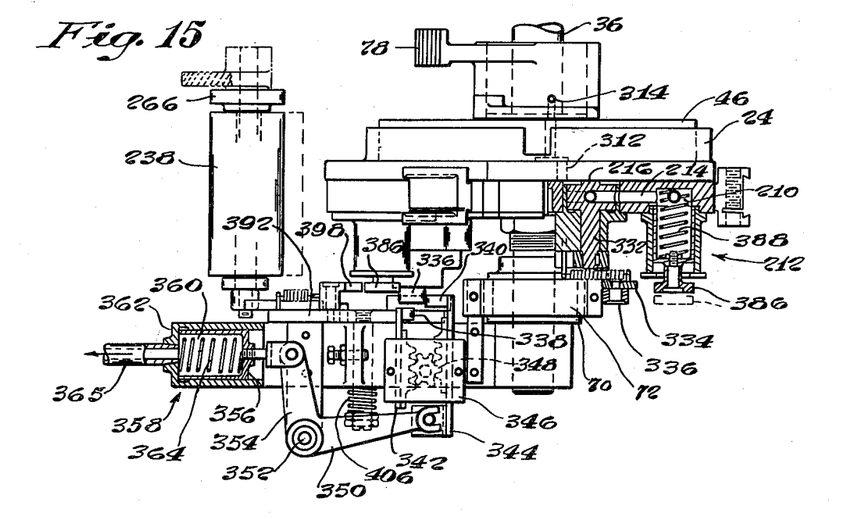
Fig. 15 is a plan view, partly in section of control mechanism.
Figure 16:
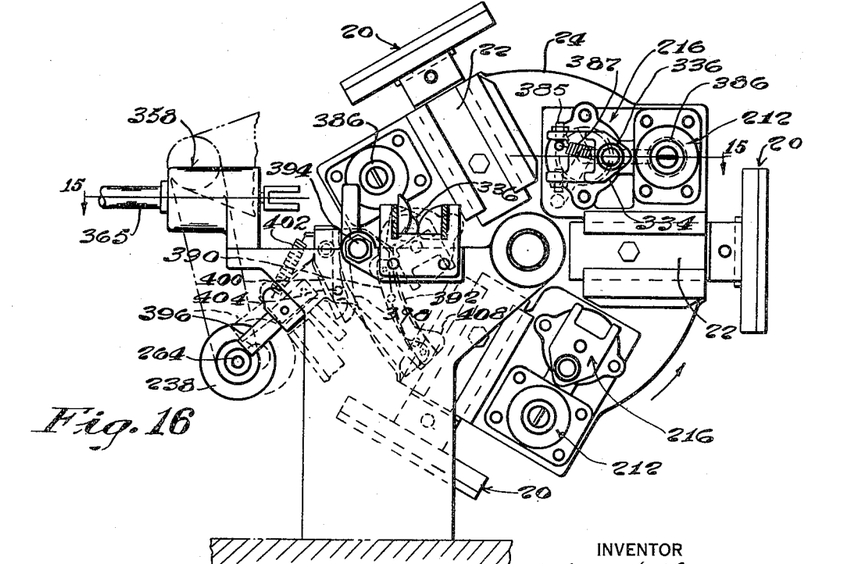
Fig. 16 is a side elevation of the same similar to Fig. 2, but with the parts shown in a different position of operation.

Referring now to Figs. 1, 9, 15 and 16 provision is made for controlling the operation of the machine to prevent the withdrawal of a label from the magazine 28 in the event that no container is present on the conveyer 10 in a position preceding the applying station, which container would normally arrive at the label applying station at the same time as its respective suction pad 20. This is accomplished through pneumatically controlled devices actuated by a container controlled valve indicated generally at 330, the control for which is disposed in the path of the containers 12 on the conveyer 10, the pneumatically controlled devices operating to rock one of the rotary valve units 216 to move the ports 218 and 220 out of alignment with the ports 214 and 222 respectively and thus cut off the vacuum to the associated suction pad. As best shown in Figs. 8, 15 and 16, each rotary valve unit 216 includes a stem 332 having an arm 334 fast on the outer end thereof. The arm 334 is provided with a roller 336 arranged to be engaged by either one or the other of two movable cams 338 and 340 arranged in the path of said roller when the suction pad is disposed in label withdrawing position. As herein shown, the cam sections 338, 340 are attached to the ends of racks 342, 344 respectively which are slidingly mounted in a bracket 346 and arranged to mesh with opposite sides of a gear 348 rotatably mounted therebetween, so that in operation, when one rack is moved in one direction the other rack is moved in the opposite direction. As best shown in Fig. 15, the rack 344 is connected to one arm 350 of a bell crank pivoted at 352, the other arm 354 being connected to a piston 356 of a pneumatically operated control unit indicated generally at 358. The piston 356 is slidingly fitted in a vacuum chamber 360 formed in the cylinder or outer casing 362 of the unit. The piston 356 is urged in one direction, to the left viewing Fig. 15, by a vacuum connection, and, a spring 364 is provided to urge the piston outwardly, to the right viewing Fig. 15 when the vacuum is cut off.

As herein shown, a pipe 365 connects the chamber 360 to the container controlled valve 330, and, a pipe 368 connects the valve to the suction creating unit 236. As illustrated in Fig. 1 the container controlled valve 330 is provided with a rod 370 arranged to be moved to present a port opening into and out of alignment with the pipes 365 and 368. The valve rod 370 is connected by a link 374 to one arm 376 of a two-armed lever pivotally mounted at 378. The second arm of the two-armed lever forms one of a pair of parallel arms 380 which carry a plate 382 arranged to be engaged by the containers as they are carried past the same. A spring 384 connected to the arm 376 is arranged to move the valve rod 370 in a direction to close the valve when a container is missing from the conveyer. Under normal operating conditions, the valve rod is held in its open position by the pressure of the containers against the plate 382 through the connections described. Thus, in normal operation, the piston member 356 is held in the position shown in Fig. 15 by the vacuum connection against the resistance of the coil spring 364, in which position the cam sections 338, 340 are disposed as shown in Fig. 15 to permit the rotary valve unit to remain open and thus permit a label to be withdrawn.

In the event no container is present on the conveyer, the vacuum line to the chamber 360 is cut off thereby permitting the coil spring 364 to move the piston member to the right viewing Fig. 15 and thus dispose the cam sections 338, 340 in a position opposite to that shown in Fig. 15, that is with the section 338 extended and the section 340 withdrawn. When the sections are thus positioned at the time the spider 24 is rotated to bring the suction pad 20 into label withdrawing position, the roller 336 will engage the cam section 338 and thus effect rocking of the rotary valve unit 216 in a clockwise direction to cut off the vacuum to the suction pad 20 and thus prevent withdrawal of a label. The valve unit 216 thus closed will remain in its closed position during its movement with the spider until it again arrives at the withdrawing station, and, assuming that a container is present on the conveyer at this time, the cam section 340 will be extended into operative position to engage the roller 336 to effect rocking of the rotary valve in a counter-clockwise direction to open the valve. As shown in Fig. 16, the arm 334 of the rotary valve unit is provided with stop screws 385 to limit the movement of the valve in either direction, and is also provided with a dead center spring 387 arranged to hold the valve in the position in which it is rotated until again acted upon by either of the cam sections 338, 340.

Provision is also made for rendering the adhesive applying device inoperative in the event that a label is not withdrawn from the magazine as above described, that is, where the valve unit 216 remains in its closed position at the withdrawing station. In such event, a roller 386 (Fig. 15) connected to the end of the pneumatically operated control unit 212, which may and preferably will be similar in construction to the control unit 358, is extended to the position shown in dotted lines in Fig. 15 by the coil spring 388 by reason of the vacuum being discontinued in the chamber 210 when the rotary unit 216 is in its closed position. When the roller 386 is in its extended position it is arranged to engage a surface 390 of a bell crank 392 pivoted at 394 as the roller passes thereby to move the bell crank in a counterclockwise direction and thus present a stop arm 396 in the path of the adhesive applying roller shaft 264 as shown in full lines in Fig. 16. Thus, in operation, when the valve 216 is in its closed position as the suction pad unit 200 is intermittently moved from the label withdrawing position and past the adhesive applying device, the roller 238 is held in its inoperative position. Thereafter, a subsequent suction pad unit 20, provided with a label, and having the roller 386 of its control unit 212 in its retracted position, as shown in full lines in Fig. 15, will effect unlocking of the adhesive applying roller 238 by engagement of the roller 386 with a surface 398 formed on an arm 400 pivotally carried by the bell crank 392 and which is provided with a spring 402 arranged to hold the arm against a stop pin 404 fast in the bell crank. Upon engagement of the roller 386 with the arm 400, the bell crank is rocked in a clockwise direction to move the stop arm 396 to the position shown in full lines in Fig. 2 out of the path of the adhesive applying roller shaft 264. As herein shown, the pivotal connection 394 of the bell crank includes a coil spring 406 arranged to frictionally hold the bell crank in the position to which it is moved and stops, not shown, may be provided to limit the movement of the bell crank in either direction. The yieldably mounting of the arm 400 permits an overthrow thereof, the stops for the bell crank limiting the movement of the latter.

Provision is also made in the present apparatus for rendering the adhesive applying device inoperative in the event that the suction pad 20 fails to withdraw a label from the magazine even though a bottle is present on the conveyer and after the valve unit 216 has been normally opened by the movable cam section 340 at the withdrawing station. Failure of the pad to withdraw a label may be caused by a depletion of the labels in the magazine or through mechanical failure.

When a label is missing from the pad 20 after withdrawal from engagement with the label magazine, atmospheric air entering the pad reduces the vacuum in the system to such an extent that the spring 388 is permitted to effect outward movement of the roller 386 so that upon subsequent movement of the pad from the withdrawing station the roller 386 will engage the surface 390 of the bell crank 392 to present the stop arm 396 into the path of the adhesive applying roller, as above described and thus prevent the application of adhesive to the pad.

Since it is not desirable to continue the reduced vacuum in the system upon such failure to withdraw a label, provision is also made for closing the rotary valve unit 216 during such subsequent movement of the pad. As illustrated in Figs. 2 and 16, the valve arm 334 and roller 336 are in alignment with a centerline passing through the valve center and the center of the control unit 212 when the valve 216 is in its open position. When the valve is in such position, and, the bell crank 392 has been rocked in a counterclockwise direction to lock the adhesive applying roller, the valve roller 336 is arranged to engage a cam surface 408 provided on the bell crank and the cam surface effects clockwise movement of the arm 334 to close the valve. It will be observed that the yieldable connection 250 permits locking of the adhesive applying unit out of cooperative engagement with the operating cam 258.

Briefly, the operation of the machine is as follows: The containers 12 are carried along on the intermittently operated conveyer 10 in spaced relation for registration with the labeling mechanism, the intermittently rotated spider 24 being rotated in timed relation to the conveyer to apply labels to successive containers. In the normal operation of the machine, the valve 216 associated with the suction pad 20 is open so that a label is withdrawn from the label magazine upon reciprocation of the pad at this station. However, in the event that a container is absent from the conveyer at a station preceding the labeling mechanism, and to which a label withdrawn could otherwise be applied, the control mechanism effects closing of the valve 216 so that no label is withdrawn. Thereafter, the pad is rotated past the adhesive applying mechanism 30 to normally apply a film of adhesive to the label. However, in the event that the valve 216 is in its closed position because of the absence of a container on the conveyer, the pneumatically operated control unit 212 effects locking of the adhesive applying roller 238 in an inoperative position to thus prevent application of adhesive to the pad. In the event that the suction pad fails to withdraw a label when the valve 216 is in its open position, the control unit 212 likewise effects locking of the adhesive applying roller in inoperative position upon subsequent movement of the pad from label withdrawing position. Disposition of the mechanism in roller locking position will effect closing of the valve 216 upon such subsequent movement. After a label is applied to a container, the latter is moved to the wiping station 32 where the label is firmly pressed against the container.

While the preferred embodiment of the invention has been herein illustrated and described it will be understood that the invention may be embodied in other forms within the scope of the following claims.

Having thus described the invention, what is claimed is:

1. In a labeling machine, in combination, a conveyer for supporting and conveying the containers to be labeled, labeling mechanism including a magazine for supporting a stack of labels, a movable suction pad adapted to engage and withdraw the lowermost label in the stack, a rotary valve in a suction line connected to said suction pad and movable therewith, an arm carried by said rotary valve, and container actuated control means including a pair of shiftable cam pieces projectable into the path of movement of the arm to engage said arm to effect opening of said rotary valve by one of said cam pieces when a container is present on said conveyer, or to effect closing of said rotary valve by the other of said cam pieces in the event that a container is not present on said conveyer whereby to prevent withdrawal of a label from the magazine.

2. In a labeling machine, in combination, a conveyer for supporting and conveying the containers to be labeled, labeling mechanism including a magazine for supporting a stack of labels, a suction pad adapted to engage and withdraw the lowermost label in the stack, a rotary valve in a suction line connected to said suction pad, an arm connected to said rotary valve, adhesive applying mechanism including a movable roller for applying a film of adhesive to the label while carried by said suction pad, a locking arm arranged to be moved into locking engagement with said adhesive applying roller, container actuated control means including a pair of pneumatically operated shiftable cam pieces arranged to cooperate with said valve arm to effect opening of said rotary valve when a container is present on said conveyer, or, to effect closing of said rotary valve in the event that a container is not present on said conveyer, and means including a pneumatically operated movable roller actuated by the closing of said rotary valve and arranged to be moved into engagement with said locking arm to render the adhesive applying roller inoperative in the event that no label is present on said suction pad.

3. In a labeling machine, in combination, a conveyer supporting and conveying the containers to be labeled, labeling mechanism including a magazine for supporting a stack of labels, a suction pad adapted to engage and withdraw the lowermost label in the stack, a rotary valve associated with said suction pad in a suction line connected thereto, an adhesive applying roller for applying a film of adhesive to the label while carried by said suction pad, a locking arm arranged to be moved into locking engagement with said adhesive applying roller, container actuated control means cooperating with said rotary valve to effect opening or closing thereof in accordance with the presence or absence of a container on said conveyer, a pneumatically operated movable roller associated with said suction line between said rotary valve and said pad and arranged to be moved into operative engagement with said locking arm to render the adhesive applying roller inoperative in the event that a label fails to be withdrawn by said suction pad, said locking arm having a portion arranged to engage said rotary valve arm to effect closing of the same when said locking arm is in its locking position.

4. In a labeling machine, a label supporting member adapted to be reciprocated into and out of engagement with a stationary container to apply the label thereto, and means for effecting reciprocation of said label supporting member including a cam member having a portion adapted to yield upon engagement of the label supporting member with the container whereby to provide a yielding pressure during the label applying operation.

5. In a labeling machine, a label supporting pad adapted to be reciprocated into and out of engagement with a stationary container to apply the label thereto, and means for effecting reciprocation of said pad including a cam having a pivotally and yieldingly mounted member forming a portion of the cam, said pivotally mounted member being arranged to be rocked with relation to the remainder of the cam upon engagement of the pad with the container whereby to provide a yielding pressure during the applying operation.

6. In a labeling machine, a label supporting member adapted to be reciprocated into and out of engagement with a stationary container to apply a label thereto, and means for effecting reciprocation of said label supporting member including a cam having a yieldingly mounted member forming a portion of the cam, said last named member being arranged to yield with relation to the remainder of the cam upon engagement of the label supporting member with the container whereby to provide a yielding pressure during the label applying operation.

JOSEPH MAGNUSSON.

REFERENCES CITED

The following references are of record in the file of this patent:

UNITED STATES PATENTS

| Number | Name | Date |
|---|---|---|
| 1,380,924 | Peters et al. | June 7, 1921 |
| 1,392,750 | Fink | Oct. 4, 1921 |
| 1,583,411 | Meyer | May 4, 1926 |
| 2,227,816 | Von Hofe | Jan. 7, 1941 |
| 2,257,785 | Carter | Oct. 7, 1941 |
| 2,339,055 | Craig | Jan. 11, 1944 |
| 2,391,694 | Everett | Dec. 25, 1945 |
| 2,494,186 | Magnusson | Jan. 10, 1950 |